May 29, 1928.

A. STEINLE 1,671,168

CALIPER GAUGE

Filed Oct. 14, 1925

Inventor:
Adolf Steinle

Patented May 29, 1928.

1,671,168

UNITED STATES PATENT OFFICE.

ADOLF STEINLE, OF JENA, GERMANY, ASSIGNOR TO THE FIRM CARL ZEISS, OF JENA, GERMANY.

CALIPER GAUGE.

Application filed October 14, 1925, Serial No. 62,374, and in Germany June 26, 1924.

Caliper gauges are already known which are provided with a movable feeling member and a part, displaceable at an angle relatively to its direction of motion and acting upon an indicating device and, with which gauges an auxiliary body (e. g. a ball) serves for transmitting the displacement of the feeling member to the part acting upon the indicating device. Besides, caliper gauges have become known in which such feeling members are used in pairs. However, all these arrangements have the drawback that the measuring pressure, which necessarily varies owing to the caliper gauge being guided by hand, impairs the indicating device. The present invention has for its object to obviate this drawback. It is possible to render insensitive a caliper gauge of the kind in question to the oscillations of the measuring pressure caused by the manual guide or to the oscillations created by the unequal distance of the parts of the surface from the axis of a boring to be measured, by arranging the feeling members in such a way that the pair of feeling members is movable in the measuring direction independently of the part connected to the indicating device.

A particularly suitable construction of the caliper gauge in which this condition is satisfied is attained by modifying it in such a way that the feeling members are delimited at the ends coacting with the said auxiliary body, by surfaces, of which at least one is inclined to the measuring direction and which bear against a ball by which the displacement of the two feeling members relatively to each other is transmited to the part connected to the indicating device. For obvious reasons it is necessary to secure the feeling members terminating in an inclined surface against rotations about axes which are parallel to the measuring direction.

Figure 1:
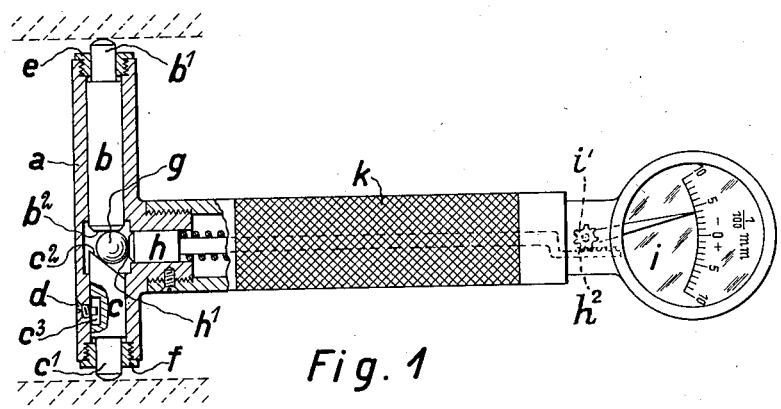
Figure 2:
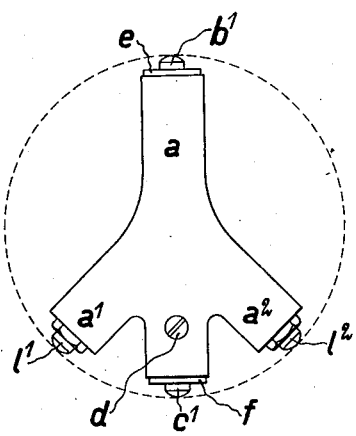
Figure 3:
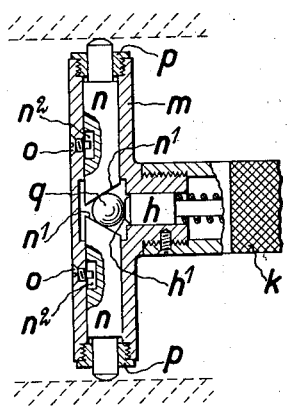
Figure 4:
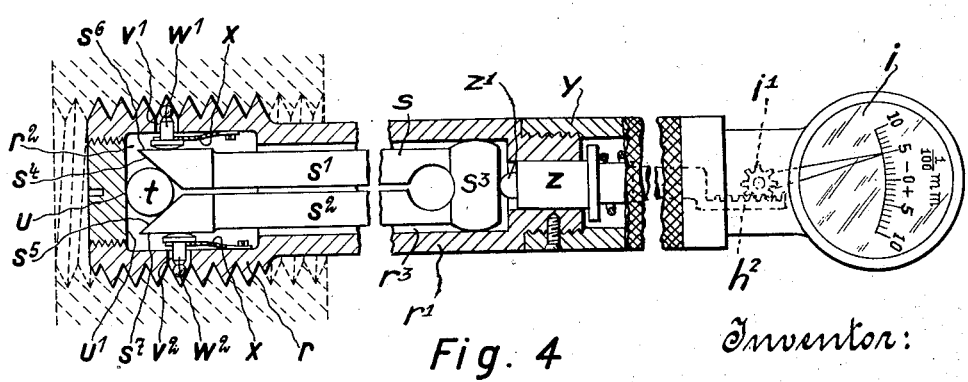
Figure 5:
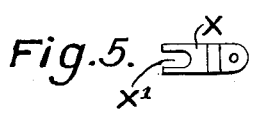

The invention is disclosed by three constructional examples shown in the accompanying drawing. Fig. 1 shows, partly in a cross section, the elevation of a caliper gauge according to the invention for measuring cylindrical borings, Fig. 2 is a top view of the measuring head thereof. In Fig. 3 is illustrated in a cross section the measuring head of a second caliper gauge serving for the same purpose. The third example shown in Fig. 4, partly in a cross section, represents a caliper gauge for measuring interior threads. Fig. 5 represents in a view a constructional part of the third example.

In the first example there is supported in a measuring head $a$ a cylindrical bolt $b$, provided with a caliper pin $b^1$ and having a plane end surface $b^2$. A second cylindrical bolt $c$, supported in the measuring head $a$ and having a caliper pin $c^1$ and an oblique end surface $c^2$, is secured against rotation about its axis by a screw $d$ which engages with its cylindrical end in a groove $c^3$. Both bolts $b$ and $c$ are held in position in the measuring head by a stop $e$, and $f$, respectively screwed in front of these bolts. Between their two end surfaces $b^2$ and $c^2$ lies a ball $g$ bearing against the plane end surface $h^1$ of a cylindrical body $h$, which is pressed against the ball $g$ by spring pressure and whose displacements in its axial direction may be read off on an indicating device $i$, the index of which being connected with the cylindrical body $h$ by a rack $h^2$ and a pinion $i^1$. The measuring head $a$ and the indicating device $i$ are screwed into a handle $k$ having a rough surface. On the measuring head $a$ are cast two supports $a^1$ and $a^2$ into which are screwed pivots $l^1$ and $l^2$ respectively, each secured by a nut, in such a way that its point of support lies on a circle whose diameter corresponds to the lower limit of the measuring range of the caliper gauge and which is determined by the feeling point of the caliper pin $c^1$.

When using the caliper gauge the two supporting pivots $l^1$ and $l^2$ must bear against the wall of the boring to be tested. A more or less strong pressure on both or one of the two pivots $l^1$ and $l^2$ cannot affect the result of measurement because the pins $b^1$ and $c^1$ always bear against the wall surface of the boring to be tested under the influence of the invariably acting power of the spring, straining the cylindrical body $h$.

In the second example there are supported in a measuring head $m$, which, as in the first example, is assumed to be provided with two supports, two like caliper pins $n$ with oblique end surfaces $n^1$ and secured against rotation by screws $o$, which engage with their cylindrical ends in grooves $n^2$. In order to protect the caliper pins $n$ against falling out of the measuring head $m$ there are provided two stops $p$. Against the two oblique end surfaces $n^1$ bears a ball $q$ which, as in the first example, is acted upon by the spring, straining the cylindrical body $h$.

In the third example a measuring head $r$, modified as a plug gauge and elongated by a tubular extension $r^1$, is provided with a boring $r^2$ which is continued in a boring $r^3$. These borings $r^2$ and $r^3$ receive a cylindrical body $s$ which is longitudinally slit into two elastic parts $s^1$ and $s^2$ and terminates in a spherical collar $s^3$. The elastic parts $s^1$ and $s^2$ bear with surfaces $s^4$ and $s^5$ inclined to the longitudinal axis against a roller $t$, resting on a surface $u^1$ of an end screw $u$, perpendicular to the thread axis. The measuring head $r$ is pierced in two places opposite each other of a thread, which lies in a plane containing the thread axis. The borings denoted by $v^1$ and $v^2$ receive caliper pins $w^1$ and $w^2$, consisting of a cylindrical part, which is provided with a supporting-ball surface and caliper-ball surface, both of which having the same center. The borings $v^1$ and $v^2$ are shaped in such a way as to allow the caliper pins $w^1$ and $w^2$ to carry out small motions in the measuring direction as well as in that direction perpendicular thereto, which is parallel to the thread axis of the measuring head $r$. The supporting-ball surfaces of the caliper pins $w^1$ and $w^2$ are kept by springs $x$ with slots $x^1$ in permanent contact with plane surfaces $s^6$ and $s^7$, which are ground on the elastic parts $s^1$ and $s^2$ of the body $s$ at the ends of these parts, projecting into the measuring head $r$, parallel to the longitudinal axis of the measuring head. To the tubular extension $r^1$ is screwed a handle $y$ with rough surface to which is again assumed to be fixed an indicating device $i$, the index of which being connected by a rack $h^2$ and a pinion $i^1$ with a caliper-lever pin $z$, which is kept in contact by spring pressure with a spherical surface $z^1$ with the body $s$.

The caliper gauge described as a third example is used for testing threads in the same way as one of the well-known plug gauges. However, it serves in addition for ascertaining by testing the flank diameters of single threads, irregularities within the thread, errors of the pitch and the like in threads found correct when tested with the plug gauge. If, e. g. a single thread has turned out too large, the caliper pins $w^1$ and $w^2$, introduced into this thread, project with their caliper-ball surface beyond the profile of thread of the measuring head $r$, and owing to the pressure of the caliper pin $z$ against the roller $t$ the two parts $s^1$ and $s^2$ are spread apart by a corresponding amount, whereby the flank diameter of the respective part of the thread is always correctly indicated on the indicating device $i$ because the caliper pins $w^1$ and $w^2$ always bear against the flanks with the same measuring pressure. Thereby, owing to the possibility of rotating the body $s$ about the spherical collar $s^3$, it is immaterial whether both or only one of the caliper pins $w^1$ and $w^2$ project beyond the profile of thread of the measuring head $r$.

I claim:

1. Caliper gauge, containing a casing, two feeling members supported in said casing substantially opposite each other and displaceable in the same straight line, a member supported in the said casing displaceable approximately perpendicular to the direction of the displacement of the two feeling members, an indicating device containing a scale and an index, means for coupling the said member with the indicating device so as to impart to the scale and the index a relative displacement as the member is displaced in the casing, and other means in said casing adapted to only impart to the said member a displacement in the casing if the feeling members displace relatively to each other.

2. Caliper gauge for measuring interior threads, containing a casing, two feeling members supported in said casing substantially opposite each other and displaceable in the same straight line as well as in a direction perpendicular to this straight line, a member supported in the said casing displaceable approximately perpendicular to the direction of the displacement of the two feeling members, an indicating device containing a scale and an index, means for coupling the said member with the indicating device so as to impart to the scale and the index a relative displacement as the member is displaced in the casing, and other means in said casing adapted to only impart to the said member a displacement in the casing if the feeling members displace relatively to one another in the direction of the said straight line.

3. Caliper gauge for measuring interior threads, containing a casing, the end of this casing carrying a thread, two feeling members supported in said casing substantially opposite each other and displaceable in the same straight line as well as in a direction perpendicular to this straight line, these feeling members projecting through openings of the said casing, a member supported in the said casing displaceable approximately perpendicular to the direction of the displacement of the two feeling members, an indicating device containing a scale and an index, means for coupling the said member with the indicating device so as to impart to the scale and the index a relative displacement as the member is displaced in the casing, and other means in said casing adapted to only impart to the said member a displacement in the casing if the feeling members displace relatively to one another in the direction of the said straight line.

ADOLF STEINLE.